(12) United States Patent
Ott et al.

(10) Patent No.: US 9,909,500 B2
(45) Date of Patent: Mar. 6, 2018

(54) SELF-PURGING FUEL NOZZLE SYSTEM FOR A GAS TURBINE ENGINE

(71) Applicant: UNITED TECHNOLOGIES CORPORATION, Hartford, CT (US)

(72) Inventors: Joe Ott, Enfield, CT (US); Stanley J Funk, Southington, CT (US); Roger O Coffey, Glastonbury, CT (US); Shawn Stempinski, Simsbury, CT (US); Lyutsia Dautova, Rocky Hill, CT (US); Dennis M Moura, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 202 days.

(21) Appl. No.: 14/801,927

(22) Filed: Jul. 17, 2015

(65) Prior Publication Data
US 2016/0017809 A1 Jan. 21, 2016

Related U.S. Application Data (60) Provisional application No. 62/026,127, filed on Jul. 18, 2014.

(51) Int. Cl.
*F02C 7/232* (2006.01)
*F23R 3/28* (2006.01)
*B33Y 80/00* (2015.01)

(52) U.S. Cl.
CPC .............. *F02C 7/232* (2013.01); *F23R 3/28* (2013.01); *B33Y 80/00* (2014.12); *F05D 2220/32* (2013.01); *F05D 2230/30* (2013.01); *F05D 2240/35* (2013.01); *F05D 2260/602* (2013.01)

(58) Field of Classification Search
CPC ........ F02C 7/232; F23R 3/28; F05D 2220/32; F05D 2240/35; B33Y 80/00
See application file for complete search history.

(56) References Cited

U.S. PATENT DOCUMENTS

| | | |
|---|---|---|
| 3,774,851 A | 11/1973 | Simmons |
| 6,244,034 B1 | 6/2001 | Taylor et al. |
| 6,256,975 B1 | 7/2001 | Dobbeling et al. |
| 6,612,272 B2 | 9/2003 | Kato et al. |
| 6,630,244 B1 | 10/2003 | Mao et al. |
| 6,675,583 B2 | 1/2004 | Willis et al. |
| 6,804,946 B2 | 10/2004 | Willis et al. |
| 7,213,394 B2 | 5/2007 | Darley et al. |
| 7,520,136 B2 | 4/2009 | Kervistin et al. |
| 7,559,201 B2 | 7/2009 | Prociw et al. |
| 7,677,025 B2 | 3/2010 | Stuttaford et al. |
| 7,818,955 B2 | 10/2010 | Nilsson |
| 7,958,721 B2 | 6/2011 | Craig et al. |
| 8,006,482 B2 | 8/2011 | Cox et al. |
| 8,340,886 B2 | 12/2012 | Nenmeni et al. |
| 2013/0000318 A1 | 1/2013 | Dalton |

(Continued)

FOREIGN PATENT DOCUMENTS

EP 2754516 A2 7/2014

*Primary Examiner* — Kevin Lee
(74) *Attorney, Agent, or Firm* — Bachman & LaPointe, P.C.

(57) ABSTRACT

A self-purge system includes an additively manufactured purge valve assembly in communication with a fuel passage to selectively purge the fuel passage.

18 Claims, 5 Drawing Sheets

(56) References Cited

U.S. PATENT DOCUMENTS

| | | | |
|---|---|---|---|
| 2014/0076154 A1* | 3/2014 | Frick et al. | F15B 15/149 91/361 |
| 2014/0116217 A1* | 5/2014 | Hashish et al. | B24C 5/02 83/177 |
| 2016/0186620 A1* | 6/2016 | Knudsen | F01L 3/08 123/188.9 |

* cited by examiner

SELF-PURGING FUEL NOZZLE SYSTEM FOR A GAS TURBINE ENGINE

CROSS REFERENCE TO RELATED APPLICATION

This application claims the benefit of provisional application Ser. No. 62/026,127, filed Jul. 18, 2014.

BACKGROUND

The present disclosure relates to a gas turbine engine and, more particularly, to a fuel nozzle system therefor.

Gas turbine engines include a compressor section to pressurize a supply of air, a combustor section to burn a hydrocarbon fuel in the presence of the pressurized air, and a turbine section to extract energy from the resultant combustion gases.

The combustor section generally includes a multiple of circumferentially distributed fuel nozzles that axially project into a forward section of a combustion chamber to supply the fuel for mixing with the pressurized air. For non-staged combustion systems, fuel passages are drained so as not to drip fuel into the combustion chamber after engine shut down. For staged combustion systems, fuel lines also need to be purged of fuel to avoid coking when that stage is not operated.

SUMMARY

A self-purge system according to one disclosed non-limiting embodiment of the present disclosure includes an additively manufactured purge valve assembly in communication with a fuel passage to selectively purge said fuel passage.

A further embodiment of the present disclosure includes, wherein the fuel passage is in communication with a fuel nozzle.

A further embodiment of any of the foregoing embodiments of the present disclosure includes, wherein the fuel passage is a portion of a fuel manifold.

A further embodiment of any of the foregoing embodiments of the present disclosure includes, wherein the fuel passage is a fuel circuit of a fuel nozzle.

A further embodiment of any of the foregoing embodiments of the present disclosure includes, wherein the additively manufactured purge valve assembly is in communication with an accumulator volume and a pressure source.

A further embodiment of any of the foregoing embodiments of the present disclosure includes, wherein the accumulator volume contains an accumulator piston with a valve.

The self-purge system according to another disclosed non-limiting embodiment of the present disclosure includes a spring that biases the accumulator piston.

A further embodiment of any of the foregoing embodiments of the present disclosure includes, wherein the accumulator piston operates in response to pressure source and the spring.

A further embodiment of any of the foregoing embodiments of the present disclosure includes a backflow valve in communication with the fuel passage.

A further embodiment of any of the foregoing embodiments of the present disclosure includes, wherein the additively manufactured purge valve assembly includes a dual ball valve.

A further embodiment of any of the foregoing embodiments of the present disclosure includes, wherein the dual ball valve includes two, one-way ball valve assemblies.

A further embodiment of any of the foregoing embodiments of the present disclosure includes a spring that biases an accumulator piston, the accumulator piston in communication with the additively manufactured purge valve assembly.

A further embodiment of any of the foregoing embodiments of the present disclosure includes, wherein the accumulator piston is sealed by a bladder seal.

A further embodiment of any of the foregoing embodiments of the present disclosure includes a bleed air valve in communication with the bladder seal.

A fuel nozzle system of a gas turbine engine according to another disclosed non-limiting embodiment of the present disclosure includes a fuel nozzle and an additively manufactured purge valve assembly in communication with a fuel passage of the fuel nozzle to selectively purge said fuel passage.

A further embodiment of any of the foregoing embodiments of the present disclosure includes, wherein the additively manufactured purge valve assembly is in communication with an accumulator volume and a pressure source.

A further embodiment of any of the foregoing embodiments of the present disclosure includes, wherein the accumulator volume contains an accumulator piston with a valve.

A further embodiment of any of the foregoing embodiments of the present disclosure includes, wherein the additively manufactured purge valve assembly includes a dual ball valve.

A further embodiment of any of the foregoing embodiments of the present disclosure includes, wherein the additively manufactured purge valve assembly is integrated with the fuel nozzle.

A further embodiment of any of the foregoing embodiments of the present disclosure includes, wherein at least a portion of the additively manufactured purge valve assembly is integrated with a flange of the fuel nozzle.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
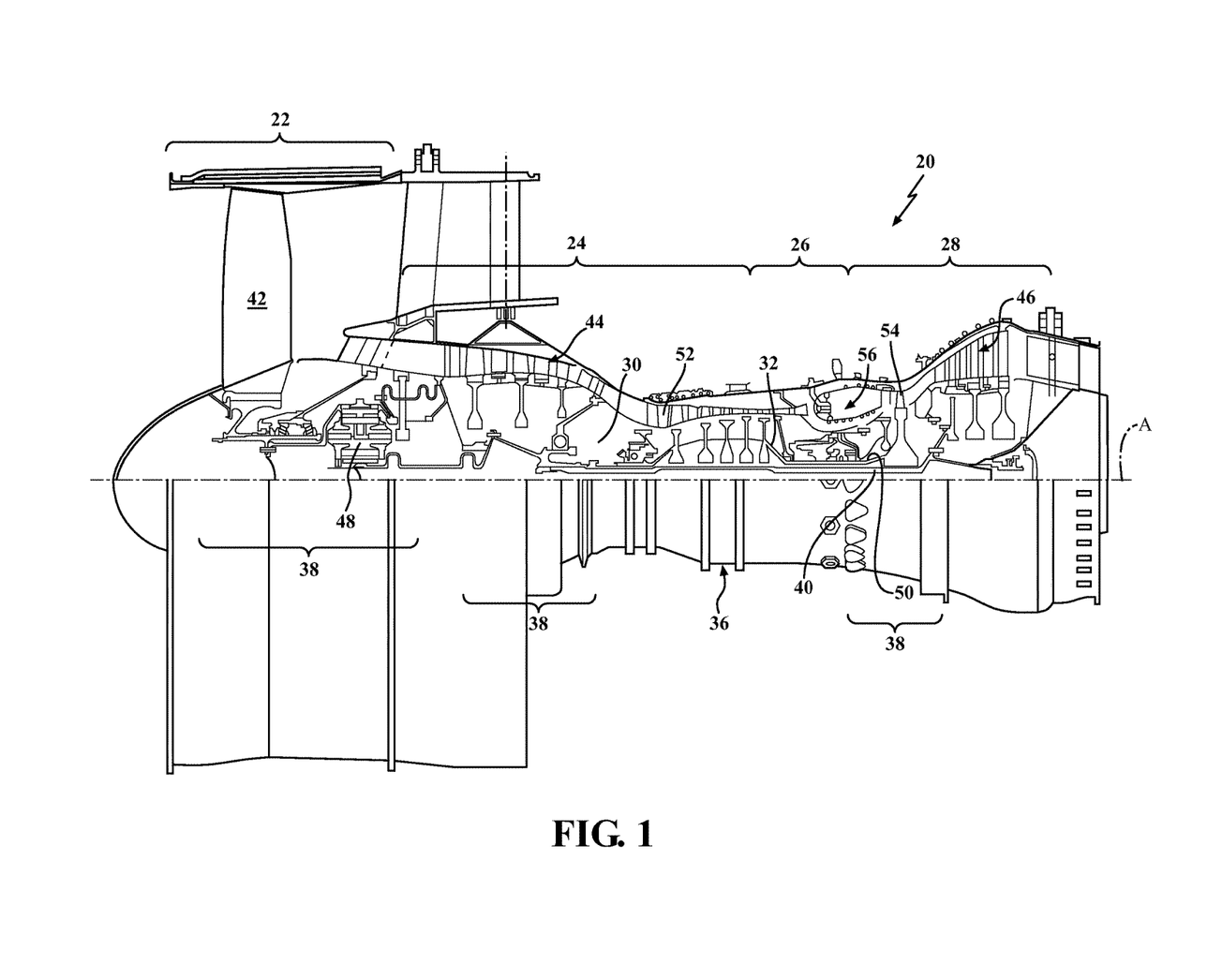
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26, then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44, then the high pressure compressor 52, mixed with the fuel and burned in the combustor 56, then expanded over the HPT 54 and LPT 46. The HPT 54 and LPT 46 rotationally drive the respective high spool 32 and low spool 30 in response to the expansion.

Figure 2:
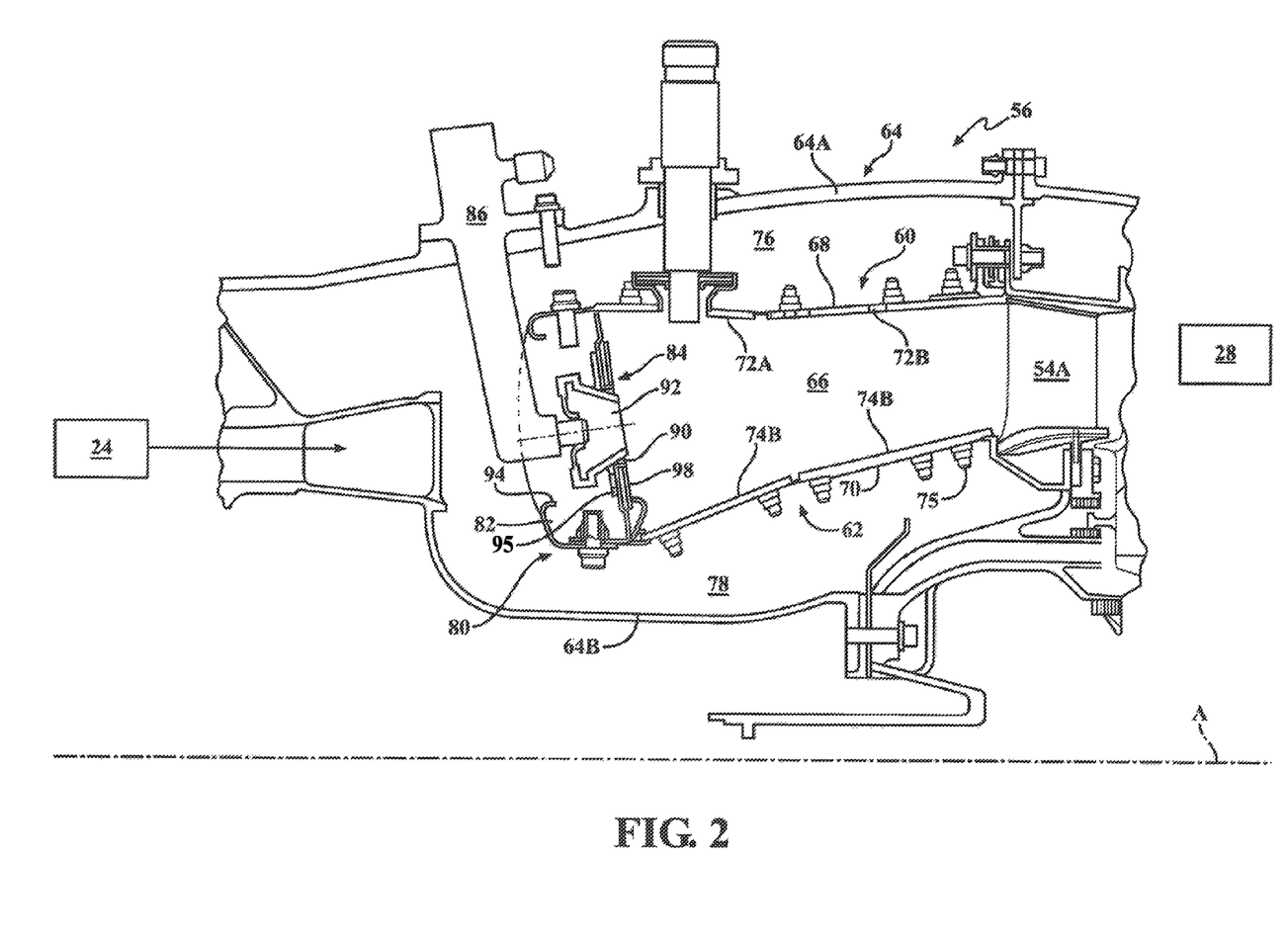
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer liner 60, an inner liner 62 and a diffuser case module 64. The outer liner 60 and the inner liner 62 are spaced apart such that a combustion chamber 66 is defined therebetween. The combustion chamber 66 is generally annular in shape. The outer liner 60 and the inner liner 62 are spaced radially inward the outer diffuser case 64 to define an annular outer plenum 76 and an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The liners 60, 62 contain the combustion products for direction toward the turbine section 28. Each liner 60, 62 generally includes a respective support shell 68, 70 which supports one or more heat shields 72, 74 that are attached there to with fasteners 75.

The combustor 56 also includes a forward assembly 80 downstream of the compressor section 24 to receive compressed airflow therefrom. The forward assembly 80 generally includes an annular hood 82, a bulkhead assembly 84, a multiple of fuel nozzles 86 (one shown) and a multiple of swirlers 90 (one shown). Each swirler 90 is circumferentially aligned with one of the hood ports 94 to project through the bulkhead assembly 84. Each bulkhead assembly 84 includes a bulkhead support shell 95 secured to the liners 60, 62, and a multiple of circumferentially distributed bulkhead heat shields 98 secured to the bulkhead support shell 95.

The annular hood 82 extends radially between, and is secured to, the forwardmost ends of the liners 60, 62. The annular hood 82 includes a multiple of circumferentially distributed hood ports 94 that accommodate the respective fuel nozzle 86 and introduce air into the forward end of the combustion chamber 66 through a central opening. Each fuel nozzle 86 may be secured to the diffuser case module 64 to project through a respective hood port 94 and swirler 90.

The forward assembly 80 introduces core combustion air into the forward end of the combustion chamber 66 while the remainder enters the annular outer plenum 76 and the annular inner plenum 78. The multiple of fuel nozzles 86 and surrounding structure generate a blended fuel-air mixture that supports combustion in the combustion chamber 66.

Opposite the forward assembly 80, the support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the HPT 54 28 to facilitate the conversion of pressure energy into kinetic energy. The combustion gases are also accelerated by the NGVs 54A because of their convergent shape and are typically given a "spin" or a "swirl" in the direction of turbine rotor rotation.

Figure 3:
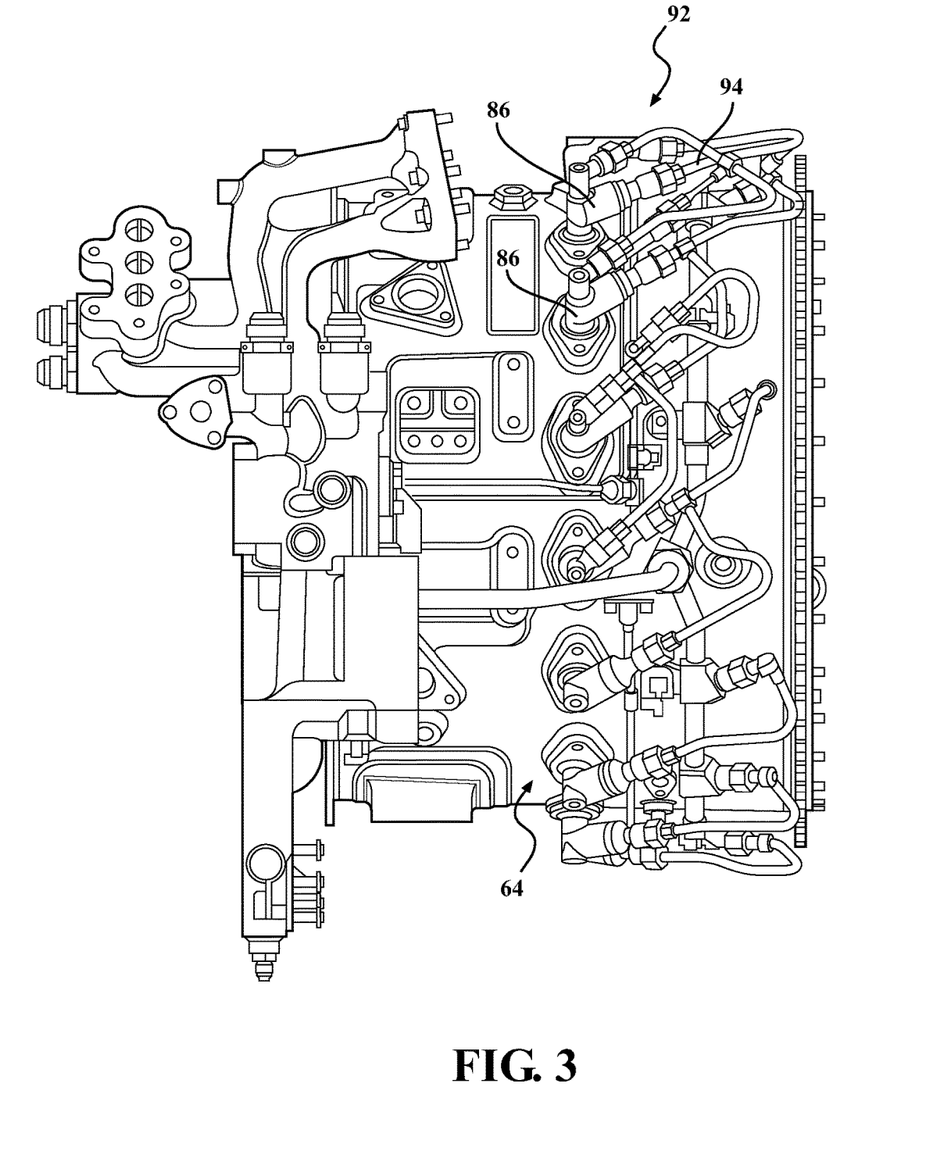
FIG. 3 is a perspective schematic sectional view a fuel nozzle system.

With reference to FIG. 3, a fuel nozzle system 92 generally includes one or more fuel nozzle supply manifolds 94 to which the multiple of fuel nozzles 86 are connected. The fuel nozzle supply manifolds 94 are located circumferentially around the diffuser case module 64 to communicate fuel to the multiple of fuel nozzles 86 to inject fuel under pressure into the combustor 56 for ignition. It should be appreciated that the fuel nozzle systems 92 will benefit herefrom. Furthermore, fuel nozzle systems for other engine sections such as an augmentor section will also benefit herefrom.

Figure 4:
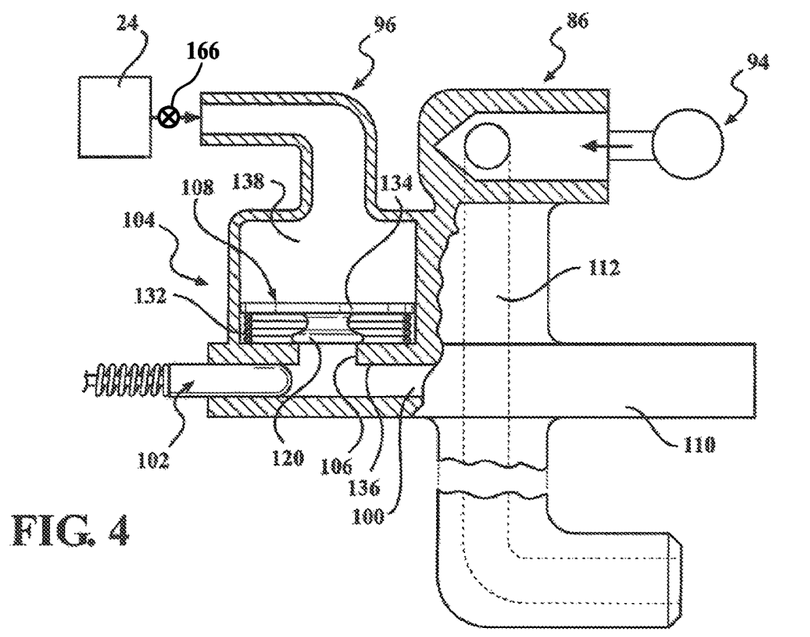
FIG. 4 is schematic sectional view a fuel nozzle.

With reference to FIG. 4, the fuel nozzle system 92 includes one or more self-purge systems 96. The self-purge system 96 may be utilized for the entire fuel nozzle system 92, each, or subsets of fuel nozzles 86, and/or for each fuel circuit of a fuel nozzle 86. That is, each fuel nozzle may include primary and secondary fuel circuits that include a separate individual self-purge system 96 to provide independent purge.

Each self-purge system 96 generally includes a first passage 100, a first valve 102, an accumulator 104, a second passage 106 and a purge valve assembly 108. It should be appreciated that although particular discrete components are schematically illustrated, the components may be combined and/or integrated directly into the respective fuel nozzle 86, fuel manifold 94 and/or the diffuser case module 64 via additive manufacturing.

The relatively complex purge valve system 96 may be readily manufactured with an additive manufacturing process. The additive manufacturing process includes, but is not limited to, Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF). The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum, Waspaloy, Stellite, Titanium, Steels, Stainless Steels, Cobalt Chrome, Hastalloy X, and others. Alloys such as 625, 718 and 230 may have specific benefit for parts that operate in high temperature environments, such as, for example, environments typically encountered by aerospace and gas turbine engine components.

The first passage 100 may be, for example, integral with a mount flange 110 of the fuel nozzle 86. The accumulator 104 communicates with the first passage 100 and a pressure source such as the compressor section 24.

The purge valve assembly 108 communicates with the second passage 106 and the second passage 106 is in communication with the first passage 100. A fuel passage 112 may be within, or in communication with, the respective fuel nozzle 86, the fuel manifold 94 or a specific fuel circuit of a staged system. That is, the fuel passage 112 is representative that which is to be purged and should not be considered limited to only particular components, passages, lines, or circuits.

One disclosed non-limiting embodiment of the purge valve assembly 108 includes a valve 120 that opens and closes a port 136 to a second passage 106. When the engine is in operation, compressor bleed air communicated through a compressor bleed air valve 166 from the compressor section 24 compresses a spring 132 of an accumulator valve 134 to seal the port 136 between the secondary passage 106 and an accumulator volume 138.

Figure 5:
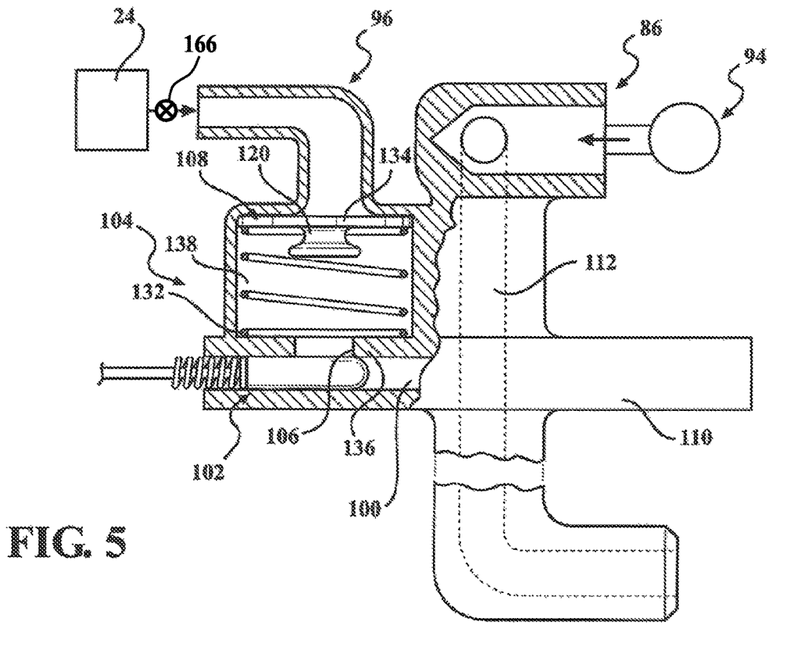
FIG. 5 is a schematic view of a self-purge system in one disclosed non-limiting embodiment in a first position.

With reference to FIG. 5, in response to engine shut down, the compressor bleed air is reduced and the spring 132 expands such that the accumulator valve 134 opens the port 136 into the accumulator volume 138. Residual fuel within the fuel passage 112 is drawn into the accumulator volume 138 to purge the fuel nozzle 86. That is, the suction from movement of the accumulator valve 134 essentially draws the residual fuel into the accumulator volume 138. Once the accumulator valve 134 reaches the full open position, the valve 102 is closed to prevent fuel backflow through the port 136. The valve 102 may be pneumatically, electrically, hydraulically or otherwise operated.

Figure 6:
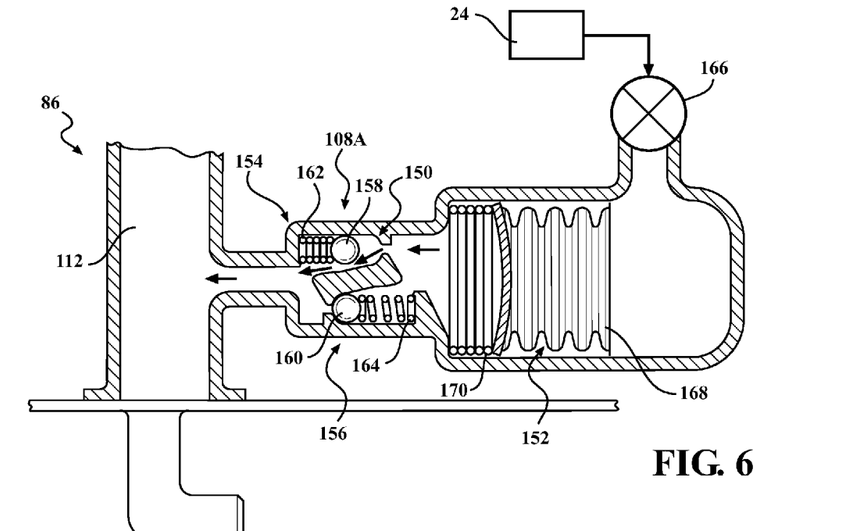
FIG. 6 is a schematic view of a self-purge system of FIG. 5 in a second position.

With reference to FIG. 6, another disclosed non-limiting embodiment of the purge valve assembly 108A includes a dual ball valve 150 between an accumulator 152 and the fuel passage 112. The dual ball valve 150 includes two, one-way ball valve assemblies 154, 156 each with a ball 158, 160 and a spring 162, 164.

When the engine is in operation, compressor bleed air flows through a compressor bleed air valve 166 such that an accumulator piston 172 compresses an accumulator spring 170 in the accumulator 152. The accumulator piston 172, sealed by a bladder 168 drives residual fuel from the accumulator 152 into the fuel nozzle 86 through the one-way ball valve assembly 150.

Figure 7:
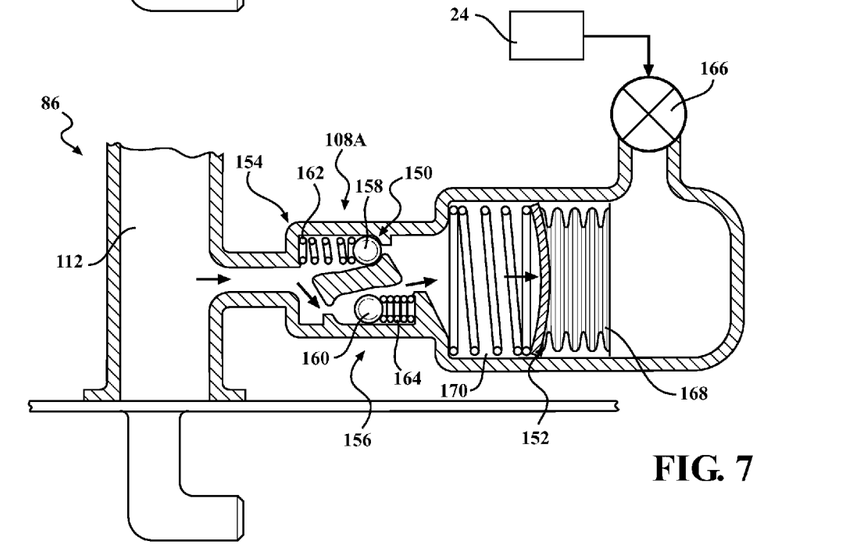
FIG. 7 is a schematic view of a self-purge system in another disclosed non-limiting embodiment in a first position.

With reference to FIG. 7, in response to engine shut down, the compressor bleed air is reduced and the accumulator spring 170 expands such that the accumulator piston 172 draws residual fuel from within the fuel nozzle 86 into the accumulator 152 though the one-way ball valve assembly 156. Once the bladder 168 reaches the full open position, the dual ball valve 150 closes under spring force to prevent fuel backflow.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A self-purge system, comprising:
an additively manufactured purge valve assembly in communication with a fuel passage to selectively purge said fuel passage, said additively manufactured purge valve assembly in communication with an accumulator volume and a pressure source, said additively manufactured purge valve assembly includes a dual ball valve.

2. The self-purge system as recited in claim 1, wherein said fuel passage is in communication with a fuel nozzle.

3. The self-purge system as recited in claim 1, wherein said fuel passage is a portion of a fuel manifold.

4. The self-purge system as recited in claim 1, wherein said fuel passage is a fuel circuit of a fuel nozzle.

5. The self-purge system as recited in claim 1, wherein said accumulator volume contains an accumulator piston with a valve.

6. The self-purge system as recited in claim 5, further comprising a spring that biases said accumulator piston.

7. The self-purge system as recited in claim 6, wherein said accumulator piston operates in response to the pressure source and said spring.

8. The self-purge system as recited in claim 6, further comprising a backflow valve in communication with said fuel passage.

9. The self-purge system as recited in claim 1, wherein said dual ball valve includes two, one-way ball valve assemblies.

10. The self-purge system as recited in claim 9, further comprising a spring that biases an accumulator piston, said accumulator piston in communication with said additively manufactured purge valve assembly.

11. The self-purge system as recited in claim 10, wherein said accumulator piston is sealed by a bladder seal.

12. The self-purge system as recited in claim 11, further comprising a bleed air valve in communication with said bladder seal.

13. A fuel nozzle system of a gas turbine engine, comprising:
a fuel nozzle; and
an additively manufactured purge valve assembly in communication with a fuel passage of said fuel nozzle to selectively purge said fuel passage, said additively manufactured purge valve assembly in communication with an accumulator volume and a pressure source, said additively manufactured purge valve assembly includes a dual ball valve.

14. The fuel nozzle system as recited in claim 13, wherein said accumulator volume contains an accumulator piston with a valve.

15. The fuel nozzle system as recited in claim 13, wherein said additively manufactured purge valve assembly is integrated with said fuel nozzle.

16. The fuel nozzle system as recited in claim 13, wherein at least a portion of said additively manufactured purge valve assembly is integrated with a flange of said fuel nozzle.

17. A self-purge system, comprising:
an additively manufactured purge valve assembly in communication with a fuel passage to selectively purge said fuel passage, said additively manufactured purge valve assembly includes a dual ball valve between an accumulator and the fuel passage.

18. The fuel nozzle system as recited in claim 17, wherein the dual ball valve includes two, one-way ball valve assemblies each with a ball and a spring.

\* \* \* \* \*